(12) United States Patent
Gudeta et al.

(10) Patent No.: US 11,787,418 B1
(45) Date of Patent: Oct. 17, 2023

(54) SYSTEMS AND METHODS FOR REAL-TIME TRACTOR-TRAILER MASS ESTIMATION

(71) Applicant: EMBARK TRUCKS INC., San Francisco, CA (US)

(72) Inventors: Solomon Genene Gudeta, Burlingame, CA (US); Sami Rajala, San Francisco, CA (US); John Scanlon, San Francisco, CA (US)

(73) Assignee: Embark Trucks Inc., San Francisco, CA (US)

( * ) Notice: Subject to any disclaimer, the term of this patent is extended or adjusted under 35 U.S.C. 154(b) by 0 days.

(21) Appl. No.: 17/982,051

(22) Filed: Nov. 7, 2022

(51) Int. Cl.
| | | |
|---|---|---|
| *G05D 1/00* | (2006.01) | |
| *G05D 3/00* | (2006.01) | |
| *G06F 7/00* | (2006.01) | |
| *G06F 17/00* | (2019.01) | |
| *B60W 40/13* | (2012.01) | |
| *B60W 40/107* | (2012.01) | |

(52) U.S. Cl.
CPC .......... *B60W 40/13* (2013.01); *B60W 40/107* (2013.01); *B60W 2300/14* (2013.01)

(58) Field of Classification Search
CPC . B60W 40/13; B60W 40/107; B60W 2300/14
See application file for complete search history.

(56) References Cited

U.S. PATENT DOCUMENTS

| | | | | |
|---|---|---|---|---|
| 6,498,976 | B1* | 12/2002 | Ehlbeck | B60T 8/17554 |
| | | | | 701/72 |
| 2012/0265366 | A1* | 10/2012 | Cahill | G01G 19/086 |
| | | | | 702/41 |
| 2013/0253814 | A1* | 9/2013 | Wirthlin | G01G 19/02 |
| | | | | 701/1 |
| 2015/0105975 | A1* | 4/2015 | Dunn | B60D 1/322 |
| | | | | 188/266.5 |
| 2019/0168773 | A1* | 6/2019 | Hamdoun | B60W 30/146 |
| 2019/0366989 | A1* | 12/2019 | James | B60T 8/1708 |
| 2020/0118353 | A1* | 4/2020 | No | G05B 23/0283 |
| 2020/0318566 | A1* | 10/2020 | Carlson | F02D 13/06 |
| 2021/0048333 | A1* | 2/2021 | Zhang | B60T 7/22 |
| 2022/0185274 | A1* | 6/2022 | Singh | B60W 10/184 |
| 2022/0260378 | A1* | 8/2022 | Hanchett | G01C 21/3461 |

* cited by examiner

*Primary Examiner* — Harry Y Oh
(74) *Attorney, Agent, or Firm* — Buckley, Maschoff & Talwalkar LLC

(57) ABSTRACT

Provided are systems, methods and computer program code for estimating a current mass of a vehicle and a trailer.

20 Claims, 10 Drawing Sheets

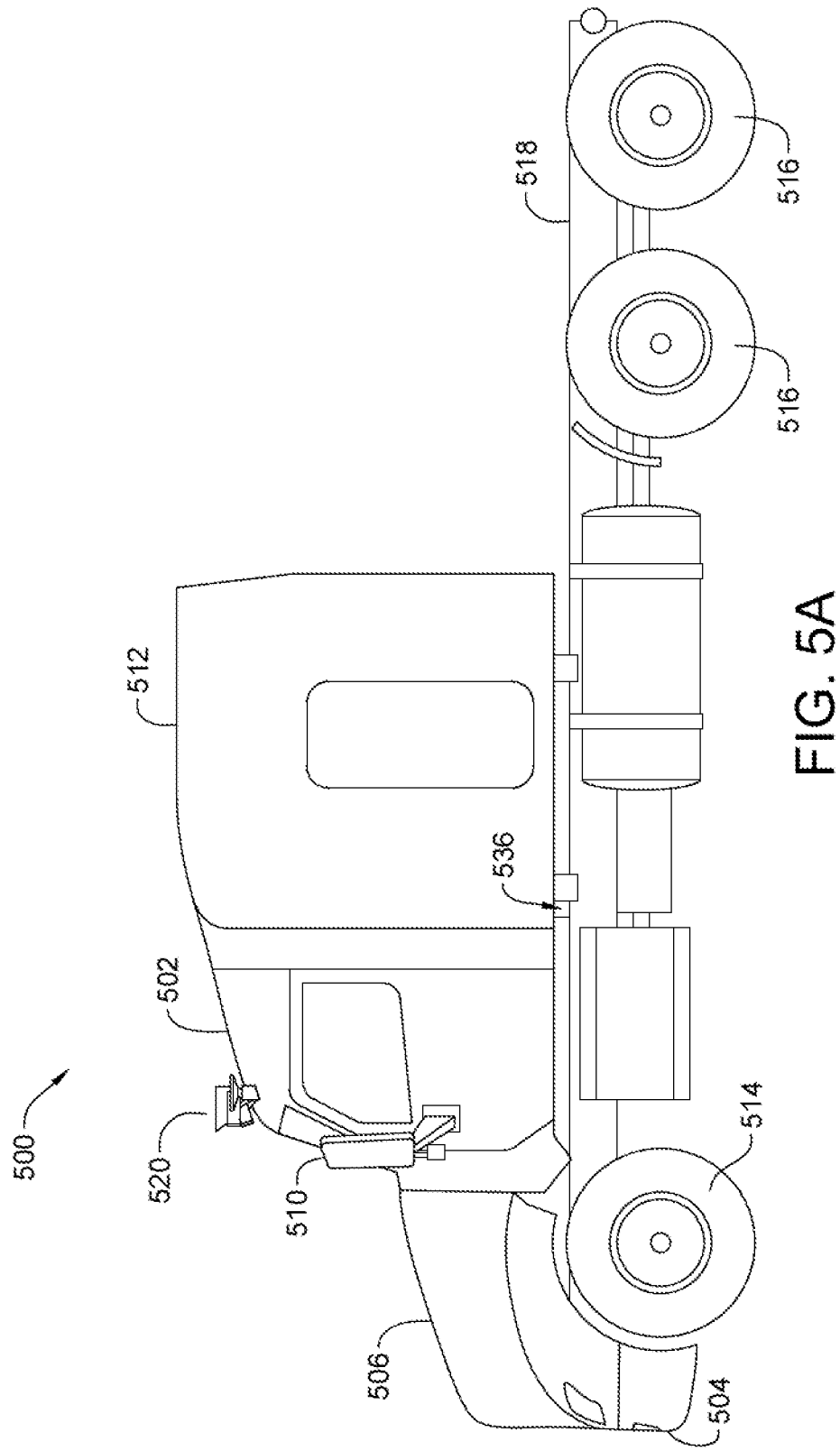

SYSTEMS AND METHODS FOR REAL-TIME TRACTOR-TRAILER MASS ESTIMATION

BACKGROUND

Autonomous or semi-autonomous vehicles rely on a substantial amount of information about the status of the vehicle to allow control of acceleration, steering, gear shifting, braking, etc. For example, autonomous or semi-autonomous vehicles, such as self-driving trucks, buses and cars, or vehicles utilizing automatic transmission depend on a correct mass estimation for acceleration and steering control, automated gear shift for a variety of conditions, and optimizing fuel consumption.

For example, the propulsion torque and brake pressures in the acceleration control of a vehicle are computed from the desired acceleration and mass of the vehicle. Also, a truck with no load in the trailer may shift the gear to a higher value to improve fuel efficiency. Further, a trailer's payload estimation can be used to improve performance and stability of a truck.

Many autonomous or semi-autonomous vehicles have a number of sensors in the vehicle which allow an online estimation of mass. However, semi-trucks or other vehicles that pull trailers pose a particularly difficult problem in that it is often inefficient and expensive to equip trailers with the different sensors needed to measure the mass and payload of the trailer.

SUMMARY

Provided are systems, methods and computer program code for estimating a current mass of a vehicle which includes receiving data from a plurality of vehicle systems, determining whether a trailer is attached to the vehicle, computing an estimate of the static mass of the vehicle and the trailer, determining whether a gating condition is met based on at least one of an acceleration measurement and a current net force measurement, computing an estimated dynamic mass of the vehicle and the trailer if the gating condition is met, and determining to use one of (i) the computed estimated dynamic mass, (ii) the static mass as the current estimated mass of the vehicle and the trailer.

Pursuant to some embodiments, computing the estimated mass of the vehicle includes computing an estimated combined truck and trailer mass, computing values of at least a first of trailer parameter, and computing an estimated mass of the trailer using the estimated combined truck and trailer mass and the at least first trailer parameter. Pursuant to some embodiments, the estimated combined truck and trailer mass and the at least first trailer parameter are provided to vehicle control systems to control operation of the vehicle.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIGS. 5A-5C are diagrams illustrating exterior views of a semi-truck that may be used in accordance with example embodiments.

Figure 1A:
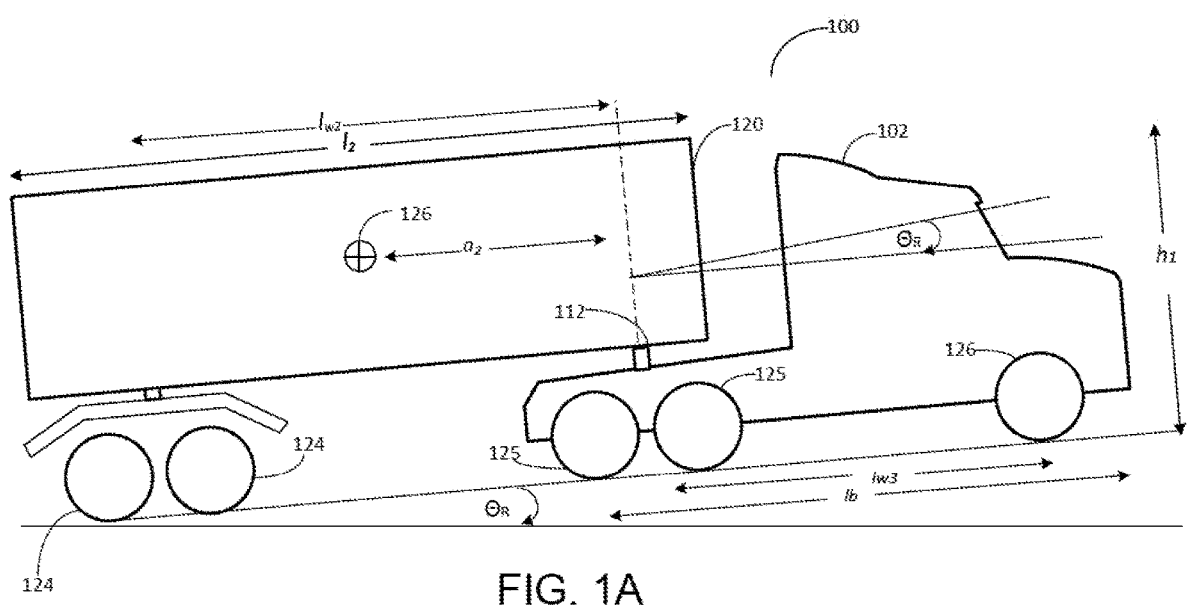
FIGS. 1A-1D are views of a semi-truck and trailer pursuant to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Pursuant to some embodiments, a truck and a truck system are provided with an estimator that is configured to generate output indicative of a combined tractor-trailer mass estimation using estimation fusion utilizing a model free Kalman filter. The model free Kalman filter includes a system based on raw mass computed from gated resultant longitudinal force and acceleration data, airbag suspension pressure data, and a system output based on a predicted mass of the truck. Pursuant to some embodiments, the resultant longitudinal force is the resultant force found from combining net propulsion, brake, air drag, rolling friction, and gravitational forces acting on a truck. The resultant longitudinal force is provided by the truck estimation package based on information from a controller area network ("CAN") bus and a localization module. The longitudinal acceleration is provided by an estimation package that fuses measurements from the GPS, IMU and CAN data. In some embodiments, the longitudinal acceleration offset is based on at least one of a road grade, and a rolling friction, and mass factor due to the effect of the rotational inertia.

For convenience and ease of exposition, a number of terms will be used herein. For example, the term "semi-truck" will be used to refer to a vehicle in which systems of the example embodiments may be used. The term "vehicle" may be used herein to refer to the combination of a truck and a trailer. Further, as will become apparent to those skilled in the art upon reading the present disclosure, embodiments of the present invention may be used in conjunction with other types of vehicles. In general, embodiments may be used with desirable results in conjunction with any vehicle towing a trailer. As used herein, the term "bobtail" is used to refer to a semi-truck when no trailer is attached.

Figure 2:
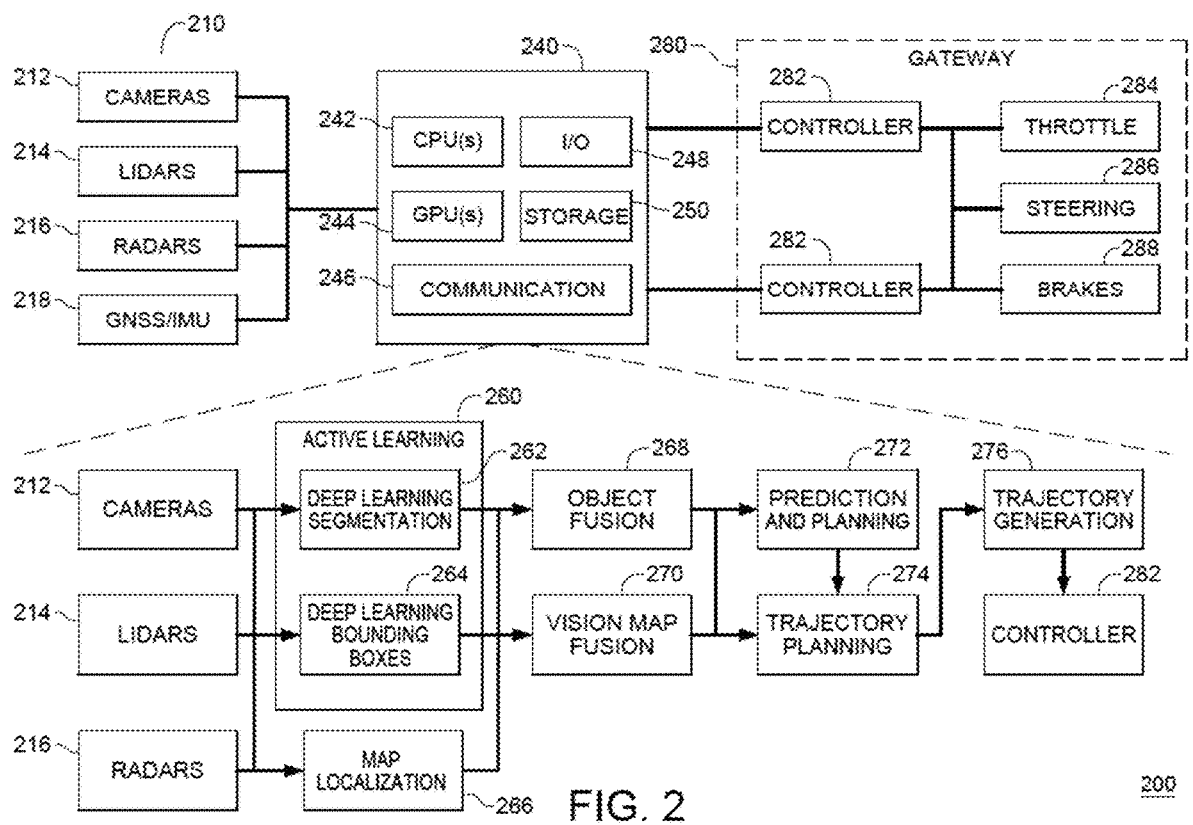
FIG. 2 is a diagram illustrating a control system that may be deployed in a vehicle such as the semi-truck depicted in FIGS. 5A-5C in accordance with an example embodiment.
Figure 3:
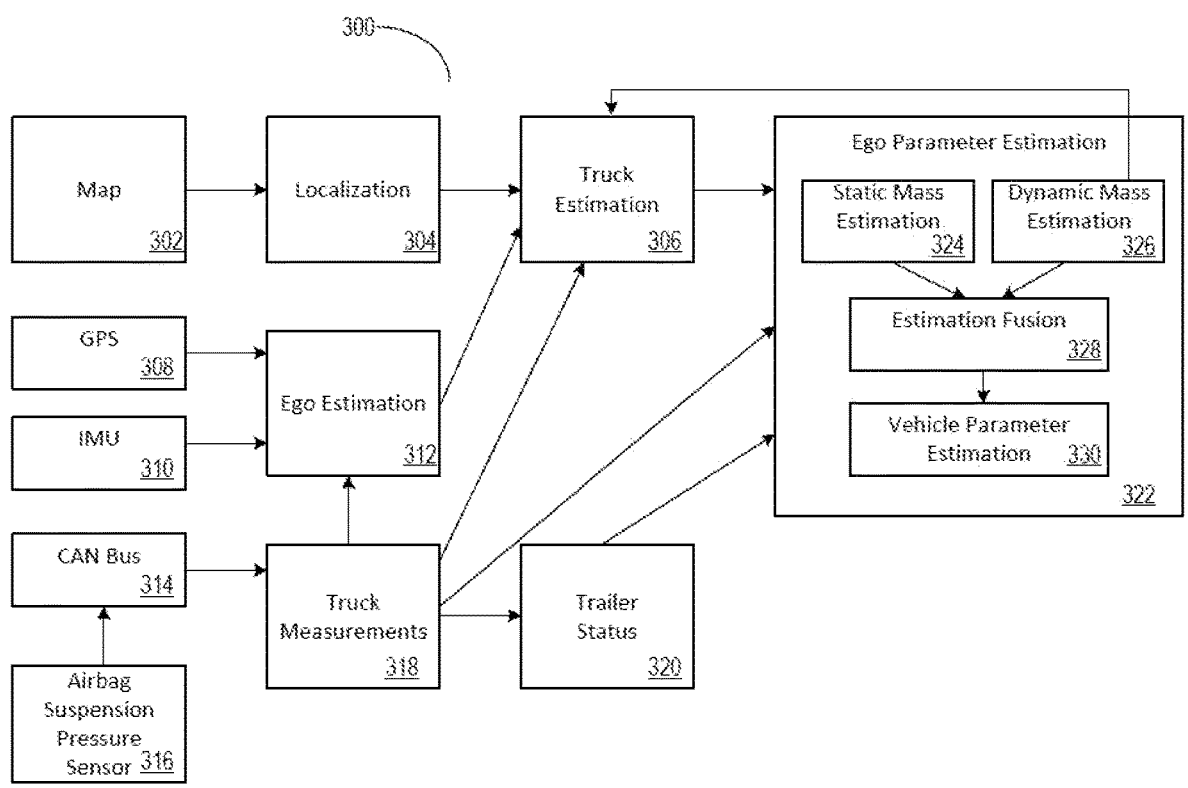
FIG. 3 is a diagram illustrating a tractor-trailer mass estimation system pursuant to some embodiments.
Figure 4:
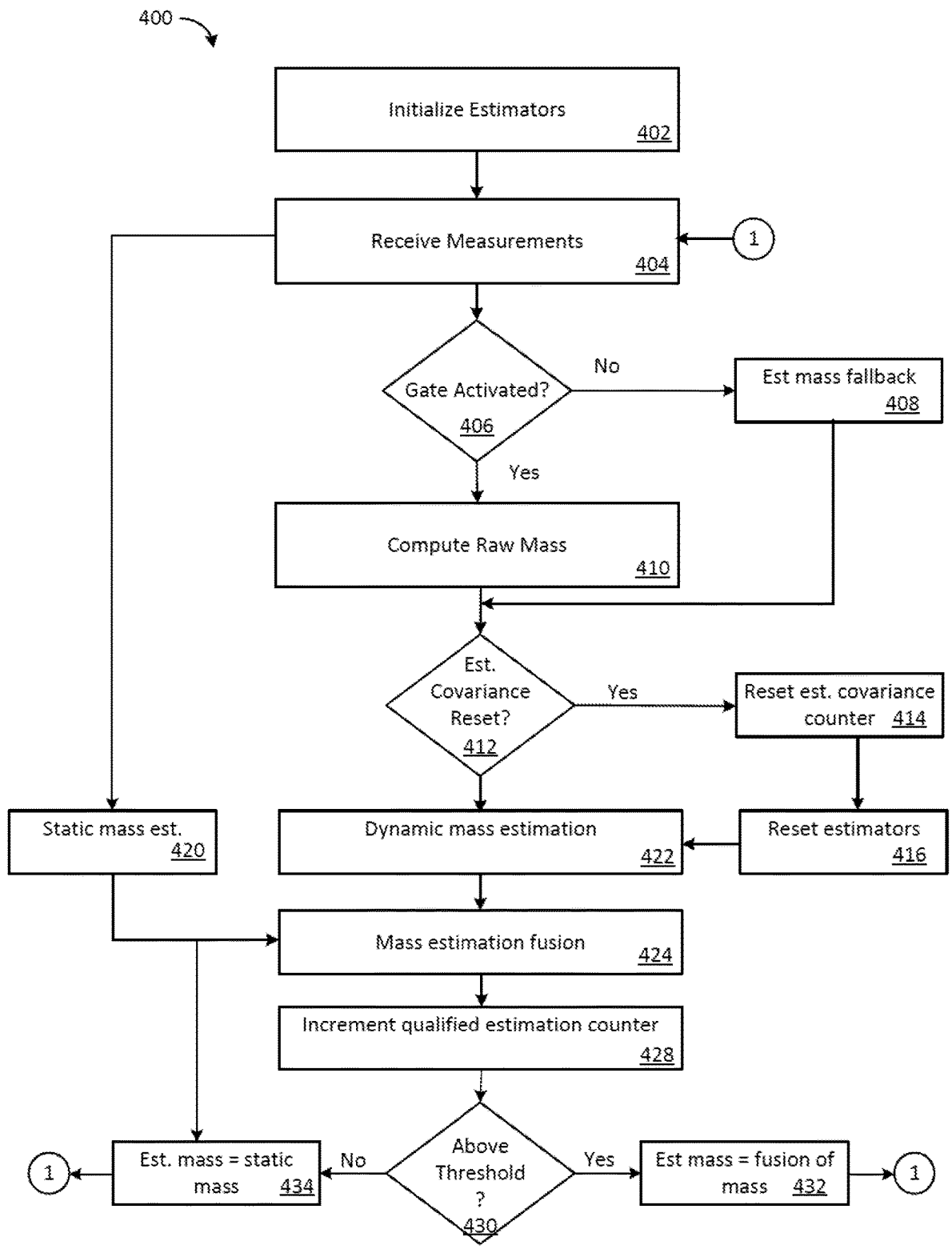
FIG. 4 is a flow diagram illustrating a tractor-trailer mass estimation process pursuant to some embodiments.

Features of some embodiments of the present invention will be described by referring to the accompanying figures. In general, FIGS. 1A-1D will introduce dimensions and attributes of a semi-truck and trailer that will be used to describe how mass estimations for such vehicles may be generated using embodiments of the present invention. FIG. 2 depicts a control system that may be deployed on a vehicle such as a semi-truck to collect and process information associated with the operation of the semi-truck. FIG. 3 depicts an estimation system that is operated using the control system of FIG. 2 to generate mass estimations pursuant to some embodiments. FIG. 4 depict a process that may be used to perform mass estimations using the present invention. FIG. 5 depicts a semi-truck and trailer (as well as associated sensors and components) in which systems and methods of the present invention may be deployed. Those skilled in the art, upon reading the present disclosure, will appreciate that embodiments may be used to estimate mass for other types of vehicles with desirable results.

Reference is first made to FIGS. 1A-1D which depict views of a semi-truck 102 pulling a trailer 120 and several angles and measurements that will be referenced herein to describe features of some embodiments. In general, understanding the mass of a trailer 120 has significant performance implications associated with the operation of a semi-truck 102. Embodiments allow the estimation of the mass of the trailer 120 (as well as the combined semi-truck 102 and trailer 120 mass) without requiring additional sensors or equipment to be mounted on or in the trailer 120. Referring first to FIG. 1A, several dimensions of interest associated with the trailer 120 are shown, including $l_2$ (the length of the trailer) and $lw_2$ (the distance between the king pin 112 and trailer axle). Several dimensions associated with the semi-truck 102 are also of interest, including the height of the semi-truck 102 ($h_1$), the length of the semi-truck 102 from the front to the rear axle ($l_b$) and the truck's wheelbase ($lw_3$). Several angles of orientation are also of interest as shown in FIG. 1, including the cabin pitch angle ($\theta_R$) and the road grade ($\theta_C$). FIG. 1 also depicts a center of gravity 126 of the trailer 120 which is positioned a distance $a_2$ from the kingpin 112. As used herein, the trailer 120 has a mass represented as $m_{trailer}$ or $m_2$ and has a force at the kingpin 112 referred to herein as $F_{kp}$ and a force at the rear axle of the trailer 120 referred to herein as $W_{at}$. Put another way, the trailer's load is reacted through its kingpin and axles. $F_{kp}$ is the load reacted by the kingpin 112, and $W_{at}$ is the load reacted by the trailer axles.

When coupled with a tractor or semi-truck 102, nearly all of the kingpin 112 load is reacted through the drive axles of the semi-truck 102 because the semi-truck's 5th wheel (the connection point between the semi-truck 102 and a trailer 120) is roughly centered over the drive axles. Additionally, the 5th wheel is attached to the frame (sprung mass) of the semi-truck 102, thus as kingpin load increases so does the load through the drive axles' suspension. Because this increase in load through the suspension would result in a change in static ride height given a constant spring rate, most Class 8 semi-trucks employ a variable air spring suspension system which compensates for changes in static kingpin load to maintain a consistent static ride height.

Applicants have determined that there is a linear relationship between kingpin load and air spring pressure for the full range of possible loads. Embodiments use this relationship to estimate load at the kingpin 112 from air suspension pressure. Further details of the air suspension system and monitoring is described further below in conjunction with FIG. 1D.

FIG. 1A also shows two dimensional properties of a trailer 120. $L_{w2}$ is the distance from the kingpin 112 to the trailer axle centerline (shown as item 121 of FIG. 1B), and $a_2$ is the distance between the kingpin 112 and the center of gravity 126 of the trailer 120 in the longitudinal direction. FIG. 1A also depicts the trailer wheels 124, and the front wheels 126 and the rear wheels 125 of the semi-truck 102. Those skilled in the art will appreciate that the configuration shown in FIG. 1 (and throughout the disclosure) are illustrative and that embodiments of the present invention may be used in configurations of truck and trailer.

Figure 1B:
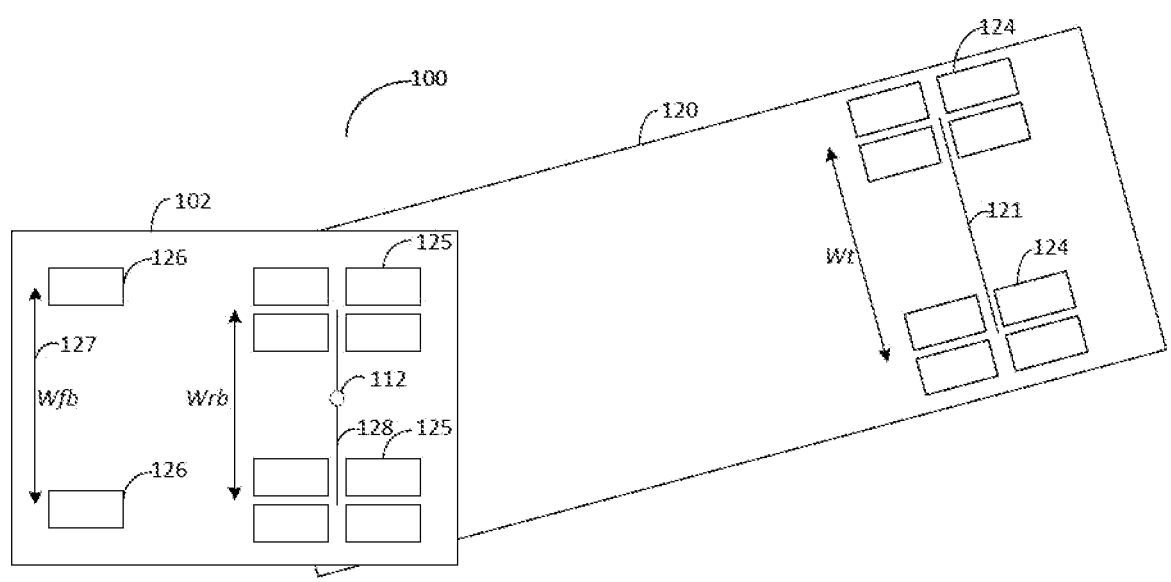

A bottom view of the semi-truck 102 and trailer 120 is shown in FIG. 1B and depicts several other dimensions of interest including the distance between the semi-truck 102 front tires ($W_fb$), the distance between the semi-truck 102 rear left and rear right tires ($W_rb$) and the distance between the trailer 120 left and right tires ($W_t$). FIG. 1B also depicts the truck steer axle 127 and drive axle 128 (with the kingpin 112 generally positioned above the rear axle 128) as well as the trailer axle 121. Those skilled in the art, upon reading the present disclosure, will appreciate that embodiments may be adapted for use in estimating trailer mass for other types of trailers (including those with different wheel, axle or other configurations from that shown in FIG. 1 or elsewhere herein).

Figure 1C:
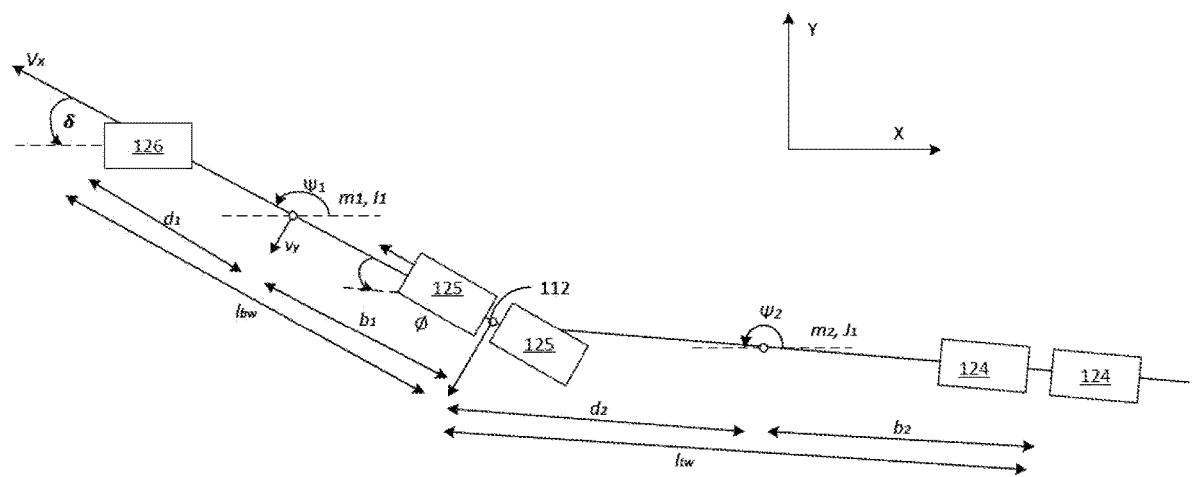

Reference is now made to FIG. 1C which depicts an articulated single-track model of a trajectory of a semi-truck 102 and trailer 120 and corresponding measurements of interest. For example, FIG. 1C shows the steering angle at tractor front tire ($\delta$), the longitudinal velocity ($v_x$), the lateral velocity ($v_y$), the tractor yaw ($\psi_1$), the trailer yaw ($\psi_2$), the tractor mass ($m_1$), the trailer mass ($m_2$), the tractor moment of inertia ($I_1$), the trailer moment of inertia ($J_1$) and the articulation angle ($\phi$). FIG. 1C also shows several distances, including the distance from the front axle to the tractor center of gravity ($a_1$), the distance from the kingpin to the trailer center of gravity ($a_2$), the distance from the tractor rear axle to tractor center of gravity ($b_1$), and the distance from the tractor axle to trailer center of gravity ($b_2$). The measurements and dimensions shown in FIGS. 1A-1C will be referred to in the following disclosure to aid in description of features of some embodiments.

Figure 1D:
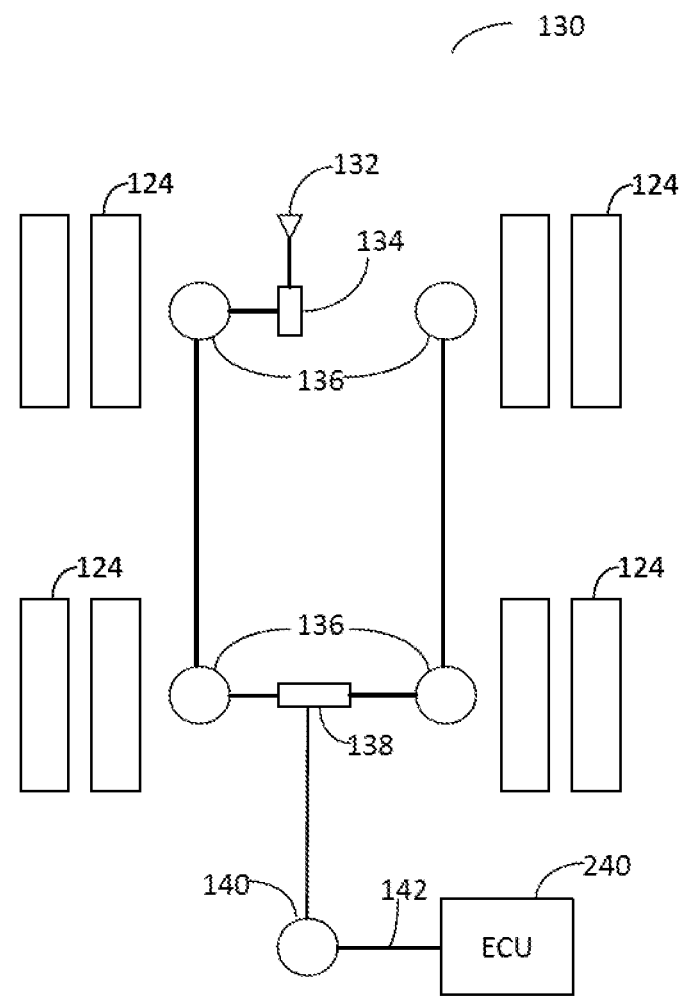

Reference is now made to FIG. 1D where a partial top view of the rear wheels 124 of the trailer 120 are shown. In general, FIG. 1D shows a layout of an air ride pressure system 130 that may be used in conjunction with some embodiments. The air bag pressure system 130 includes a number of air bags 136 (or "air springs") which are oriented on axles (not shown in FIG. 1D but partially shown in FIG. 1B) connecting the wheels 124 of the trailer 120 to provide leveling of the trailer 120 using an air supply 132, one or more leveling valves 134, one or more t-fittings 138 and one or more pressure transducers 140. The air bag pressure management system 130 may be based on an original equipment manufacture ("OEM") air bag system (consisting of the air supply 132, the leveling valve 134 and the air bags 136). Pursuant to some embodiments, the t-fitting 138 is plumbed in-line with the air bags 136 and to the pressure transducer 140 (which may be, for example, a 150 psi pressure transducer). The pressure transducer 140 receives unregulated excitation and ground from vehicle power sources and may be internally regulated. The pressure transducer 140 provides an analog output (e.g., such as a 1-5 volt analog output signal) which is converted using a 12-bit analog to digital controller for provision as a digital signal to the vehicle control system 240 (e.g., such as the system 240 of FIG. 2). The pressure signal is used to provide suspension pressure data for use in the estimation processing of the present invention as will be described further below.

Embodiments of the present invention may be used in conjunction with a number of different types of vehicles, including driver-operated, semi-autonomous and fully autonomous vehicles. For the purposes of illustrating features of the invention, embodiments will be described which may be used in conjunction with autonomous or semi-autonomous semi-trucks. In some embodiments, these vehicles may be deployed with control systems such as the control system 200 shown in FIG. 2. FIG. 2 illustrates a control system 200 that may be deployed in a vehicle such as the semi-truck 500 depicted in FIGS. 5A-5C, in accordance with an example embodiment. Pursuant to some embodiments, the control system 200 may be used to generate mass estimates of the semi-truck 102 and the trailer 120 (individually as well as a combined system mass). The control system 200 may include sensors 210 which collect data and information provided to a central computer system 240 to perform operations including, for example, control operations which control components of the vehicle via a gateway 280. Pursuant to some embodiments, the gateway 280 is configured to allow the central computer system 240 to control different components from different manufacturers.

The central computer system 240 may be used to operate or execute one or more programs or routines. For example, as will be described further below, pursuant to some embodiments, the central computer system 240 may perform estimation processing such as the estimation processing described further below in conjunction with FIGS. 3 and 4.

The central computer system 240 may be configured with one or more central processing units (CPUs) 242 to perform processing to implement features of embodiments of the present invention as described elsewhere herein as well as to receive sensor data from sensors 210 for use in generating control signals to control one or more actuators or other controllers associated with systems of the vehicle (including, for example, actuators or controllers allowing control of a throttle 284, steering systems 286, brakes 288 or the like). In general, the control system 200 may be configured to operate the semi-truck 500 in an autonomous (or semi-autonomous) mode of operation.

For example, the control system 200 may be operated to capture images from one or more cameras 212 mounted on various locations of the semi-truck 500 and perform processing (such as image processing) on those images to identify objects proximate or in a path of the semi-truck 500. Further, one or more lidar 214 and radar 216 sensors may be positioned to sense or detect the presence and volume of objects proximate or in the path of the semi-truck 500.

Other sensors may also be positioned or mounted on various locations of the semi-truck 500 to capture other information such as position data. For example, the sensors may include one or more satellite positioning sensors and/or inertial navigation systems such as GNSS/IMU 218. A Global Navigation Satellite System (GNSS) is a space-based system of satellites that provide the location information (longitude, latitude, altitude) and time information in all weather conditions, anywhere on or near the Earth to devices called GNSS receivers. An inertial measurement unit ("IMU") is an inertial navigation system. In general, an inertial navigation system ("INS") measures and integrates orientation, position, velocities, and accelerations of a moving object. An INS integrates the measured data, where a GNSS is used as a correction to the integration error of the INS orientation calculation. Any number of different types of GNSS/IMU 218 sensors may be used in conjunction with features of the present invention. The data collected by each of these sensors may be processed by the computer system 240 to generate control signals that control the operation of the semi-truck 500.

Some sensor data may be passed to the computer system 240 via a controller area network ("CAN bus"), a message based protocol that allows controllers and devices to communicate with each other without a host computer. For example, embodiments may use CAN bus protocols to obtain engine and transmission information of the vehicle (e.g., for use in performing mass estimation as described further herein).

For example, estimated mass data calculated by the control system 200 as described in conjunction with FIGS. 3-4 may be processed and used by the control system 200 to generate control signals to adjust the throttle 284, steering 286 or brakes 288 as needed to safely operate the semi-truck 500. For example, some embodiments allow the estimation of vehicle mass as well as trailer parameters (such as the load center of gravity and estimates of trailer mass) and these estimates can be used to more accurately control the operation of the semi-truck 500 (e.g., to allow fine control of the throttle 284 based on the estimated mass).

The computer system 240 may include computer code which operates to perform a process such as the process 400 of FIG. 4 to generate mass estimates. The computer system 240 may also cause information associated with the trailer orientation to be displayed to an operator (e.g., via I/O devices 248). While illustrative example sensors and actuators or vehicle systems are shown in FIG. 2, those skilled in the art, upon reading the present disclosure, will appreciate that other sensors, actuators or systems may also be used.

Figure 5B:
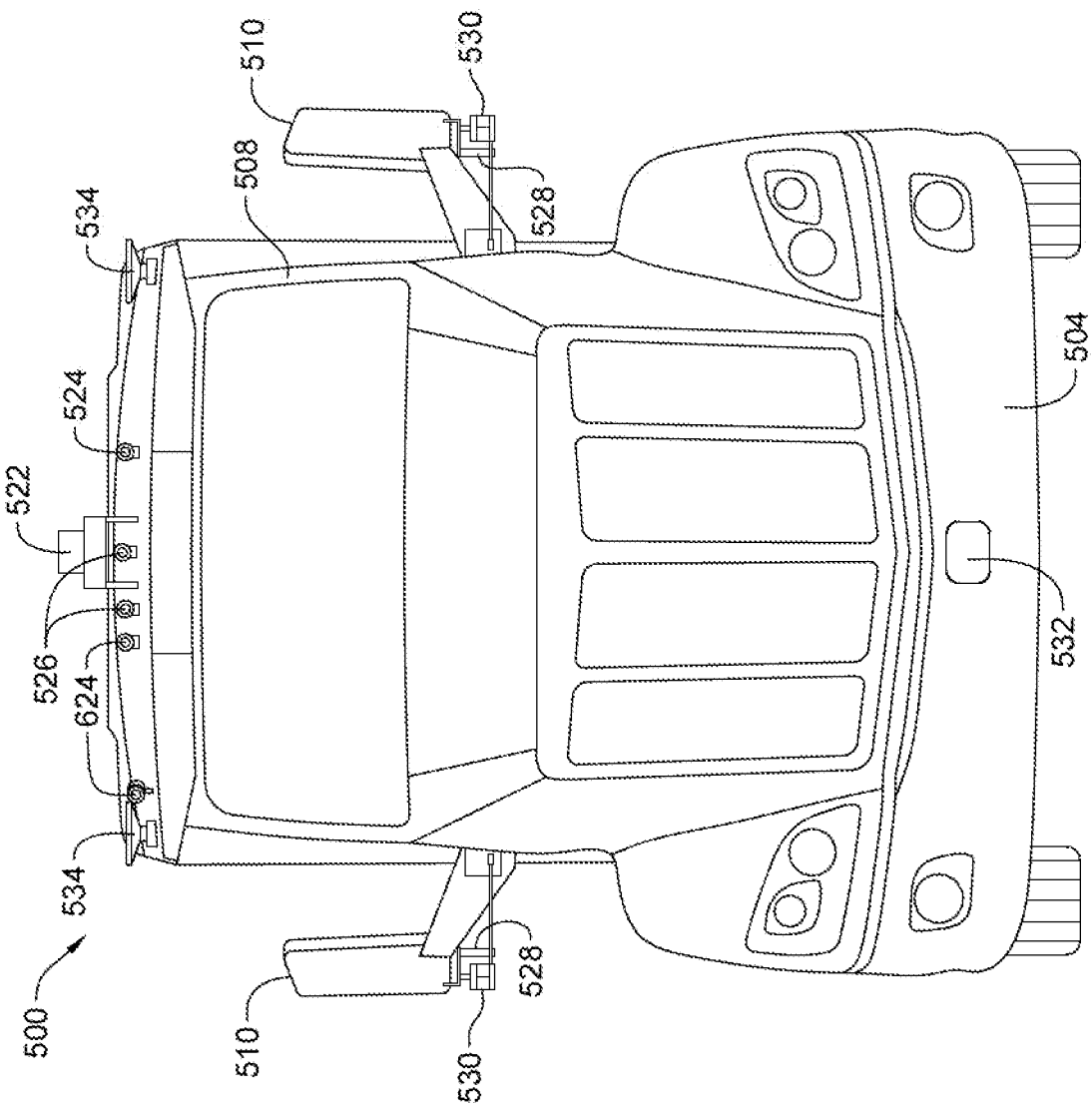
Figure 5C:
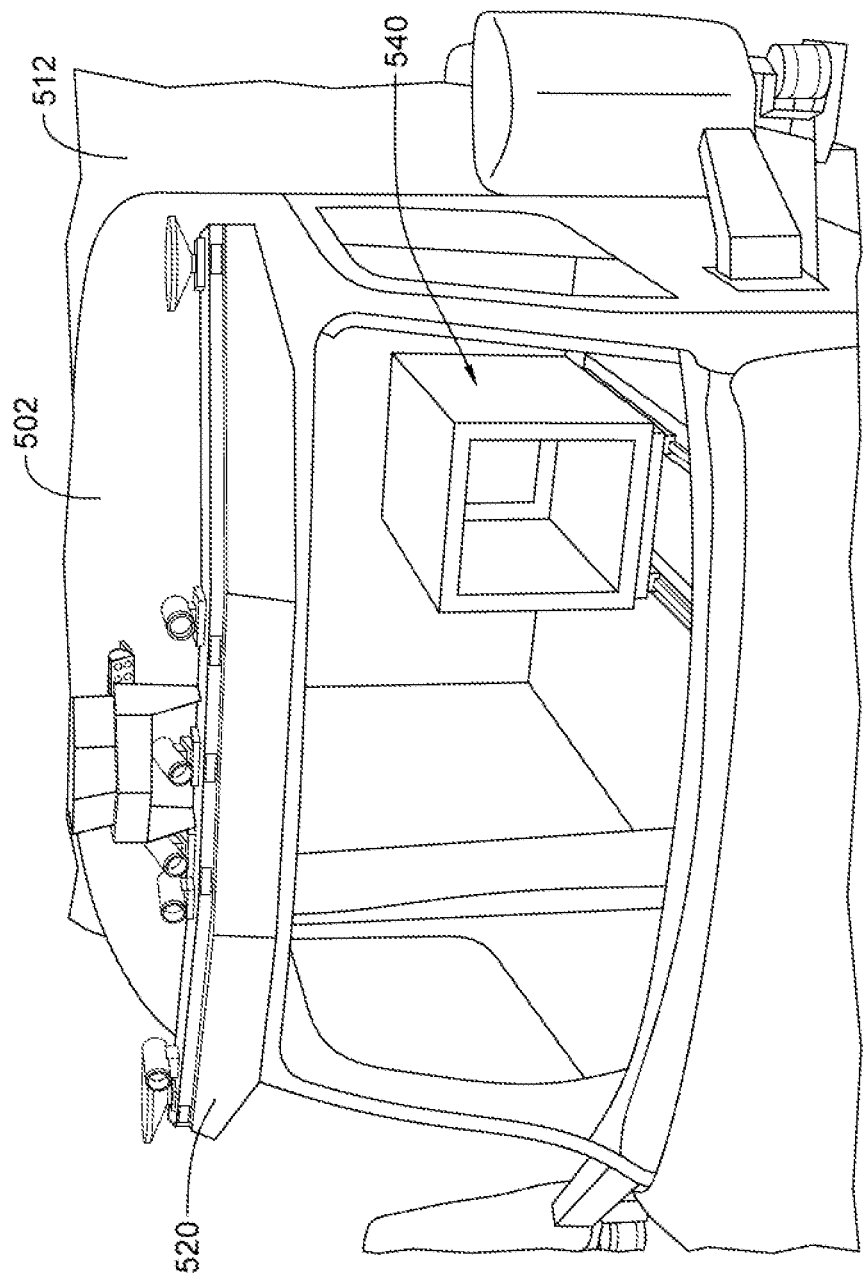

The control system 200 may include a computer system 240 (such as a computer server) which is configured to provide a computing environment in which one or more software or control applications (such as items 260-282) may be executed to perform the processing described herein. In some embodiments, the computer system 240 includes components which are deployed on a semi-truck 500 (e.g., they may be deployed in a systems rack 540 positioned within a sleeper compartment 512 as shown in FIG. 5C). The computer system 240 may be in communication with other computer systems (not shown) that may be remote from the semi-truck 500 (e.g., the computer systems may be in communication via a network connection).

According to various embodiments described herein, the computer system 240 may be implemented as a server. In some embodiments, the computer system 240 may be configured using any of a number of well-known computing systems, environments, and/or configurations such as, but not limited to, personal computer systems, cloud platforms, server computer systems, thin clients, thick clients, handheld or laptop devices, tablets, smart phones, databases, multiprocessor systems, microprocessor-based systems, set top boxes, programmable consumer electronics, network PCs, minicomputer systems, mainframe computer systems, distributed cloud computing environments, and the like, which may include any of the above systems or devices, and the like. While the computer system 240 is shown as being deployed on a vehicle, in some embodiments, some of the components of the computer system 240 may be deployed remotely from the vehicle.

A number of different software applications or components may be executed by the computer system 240 and the control system 200. For example, as shown, applications may be provided which perform active learning machine processing (active learning component 260) to process images captured by one or more cameras 212 and information obtained by lidars 214. For example, image data may be processed using deep learning segmentation models 262 to identify objects of interest in those images (such as, for example, other vehicles, construction signs, etc.). As will be described further below in conjunction with FIGS. 3 and 4, the computer system 240 may also perform processing to receive localization data, perform truck mass estimation, perform ego and truck state estimation, receive or identify truck measurement data, receive or identify trailer status information, perform vehicle parameter estimation, etc.

These applications or components (as well as other components or flows described herein) may be implemented in hardware, in a computer program executed by a processor, in firmware, or in a combination of the above. A computer program may be embodied on a computer readable medium, such as a storage medium or storage device. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

A storage medium may be coupled to the processor such that the processor may read information from, and write information to, the storage medium. In an alternative, the storage medium may be integral to the processor. The processor and the storage medium may reside in an application specific integrated circuit ("ASIC"). In an alternative, the processor and the storage medium may reside as discrete components. For example, FIG. 2 illustrates an example computer system 240 which may represent or be integrated in any of the above-described components, etc. FIG. 2 is not intended to suggest any limitation as to the scope of use or functionality of embodiments of the application described herein. The computer system 240 is capable of being implemented and/or performing any of the functionality set forth hereinabove.

The computer system 240 may be described in the general context of computer system-executable instructions, such as program modules, being executed by a computer system. Generally, program modules may include routines, programs, objects, components, logic, data structures, and so on that perform particular tasks or implement particular abstract data types. The computer system 240 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, the computer system 240 is shown in the form of a general-purpose computing device. The components of the computer system 240 may include, but are not limited to, one or more processors (such as CPUs 242 and GPUs 244), a communication interface 246, one or more input/output interfaces 248 and one or more storage devices 250. Although not shown, the computer system 240 may also include a system bus that couples various system components including system memory to the CPUs 242. In some embodiments, the input/output interfaces 248 may also include a network interface. For example, in some embodiments, some or all of the components of the control system 200 may be in communication via a controller area network ("CAN") bus or the like.

The storage device 250 may include a variety of types and forms of computer readable media. Such media may be any available media that is accessible by computer system/server, and it may include both volatile and non-volatile media, removable and non-removable media. System memory, in one embodiment, implements the flow diagrams of the other figures. The system memory can include computer system readable media in the form of volatile memory, such as random access memory (RAM) and/or cache memory. As another example, storage device 250 can read and write to a non-removable, non-volatile magnetic media (not shown and typically called a "hard drive"). Although not shown, the storage device 250 may include one or more removable non-volatile disk drives such as magnetic, tape or optical disk drives. In such instances, each can be connected to the bus by one or more data media interfaces. Storage device 250 may include at least one program product having a set (e.g., at least one) of program modules that are configured to carry out the functions of various embodiments of the application.

Reference is now made to FIG. 3 where a block diagram is shown illustrating a system 300 for estimating the mass of a semi-truck 102 and trailer 120 (or combination thereof). As shown in FIG. 3, the system 300 may include several devices, components and sensors that are associated with the semi-truck 102 and which are used to perform mass estimation pursuant to some embodiments of the present invention. The system 300 may be operated to perform mass estimation of the semi-truck 102 and/or of the trailer 120. The system 300 may act in conjunction with other vehicle sensors and systems such as those shown in the semi-truck 500 described in conjunction with FIGS. 5A-5C as well as the control system 200 of FIG. 2. That is, in one practical application, the mass estimation system 300 shown in FIG. 3 is deployed on a vehicle in conjunction with other vehicle sensors and systems. In some embodiments, some (or all) of the components or modules of the system 300 may be deployed remotely from the vehicle.

The mass estimation system 300 may include a number of components including one or more software modules or components that may be executed by, for example, the central computer system 240 of FIG. 2. For example, the modules or components include a truck measurement module 318, a localization module 304, a truck estimation module 306, an ego estimation module 312, an ego parameter estimation module 322 and a trailer status module 320. Each of these modules receives data from one or more sensors, components or modules and produces output data (including, for example, road grade data, pressure data, CAN data, etc.). Further, the modules (such as the ego estimation module 312, the truck estimation module 306 and the ego parameter estimation module 322) may output data or other signals that are used by the central computer system 240 to control the semi-truck 500 as described herein.

The localization module 304 may, for example, receive data associated with the geographic location of the vehicle (e.g., such as from a 3d map module 302 which provides information that allows the localization module 304 to estimate road grade information including, for example, information to calculate a parameter ($\theta_R$) associated with the current road grade the vehicle is experiencing. The localization module 304 may use data from the 3d map module 302 or other information to calculate the road grade data (e.g., such as information from other sensors mounted on the semi-truck).

The truck measurement module 318 receives data from other components or systems on the vehicle, e.g., from a controller area network ("CAN") bus. The truck measurement module 318 may output truck measurement data to other modules, such as the ego estimation module 312, the truck estimation module 306, the ego parameter estimation module 322 and the trailer status module 320. For example, the truck measurement module 334 may be configured to provide information about the air bag suspension pressure data of the vehicle to the ego parameter estimation module 322 for use in performing mass calculations. The estimated mass data may, for example, be stored as a parameter accessible to the truck measurement module 318.

The truck measurements module 318 may also provide airbag suspension pressure readings to a trailer status module 320 for use in automatically determining the presence of a trailer. In some embodiments, applicants have found that a airbag suspension pressure reading (e.g. received from the components shown in FIG. 1D) is a reliable way of determining the presence of a trailer 120, particularly at the start of a trip. The suspension pressure reading increases immediately after a trailer 120 is attached to a semi-truck 102. Pursuant to some embodiments, the suspension pressure value that can be used as a trailer presence detection limit can be measured by first recording the filtered suspension pressure reading from the vehicle when a trailer is not attached. Applicants have found that filtering should be used to clean out possible spikes in the readings that may be caused by driving over uneven roads. A low pass filter with a large time constant (approximately 3 minutes, for example) is desirable because the trailer status and weight will not change rapidly. The measurement is then repeated when an empty trailer is attached. A trailer presence limit value may then be established by, for example, calculating the average value between these pressures (the pressure without a trailer and the pressure with an empty trailer attached). A hysteresis limit may also be calculated (by subtracting the trailer presence limit from the empty trailer pressure value and dividing by two). The limit and hysteresis value may be stored as constants in the control system 200.

In operation, the limit and hysteresis values may be used by the trailer status module 320 to determine the presence of a trailer 120 as follows. First, the suspension pressure is read (as shown in FIG. 1D). The suspension pressure value may be provided via a CAN bus 314 (for example) and provided to the truck measurement module 318 which may provide the suspension pressure value and the limit and hysteresis values to the trailer status module 320. The suspension pressure may be filtered and compared to the trailer detection limit with the hysteresis value added to determine whether the reading is sufficiently different from the limit to update the status. If the suspension pressure value is greater than the trailer detection limit plus the hysteresis value, then a trailer 120 is present. If not, a trailer 120 is not present. This trailer detection process may be repeated on a regular basis or at the start of a trip. As will be discussed below, the presence of a trailer may be a condition precedent to the mass estimation processing of FIG. 4.

Other sensor data may also (or alternatively) be used to determine the presence of a trailer 120. For example, rear-facing sensors (such as lidar, cameras, etc.) may be used to detect the presence and dimensions of a trailer 120. Engine torque and brake force may also be measured to detect the presence of a trailer 120, however these techniques require the vehicle to move which makes it difficult to detect the presence of a trailer 120 at the beginning of a trip.

The truck estimation module 306 receives truck measurement data from the truck measurement module 318, the road grade data from the localization module 304, ego state data from the ego estimation module 312, and vehicle parameter data from a vehicle parameter estimation module 330 of the ego parameter estimation module 322. The truck estimation module 342 uses this information, along with estimated mass data to calculate an estimated net force as described further herein.

The ego estimation module 312 receives data associated with the position and movement of the vehicle from systems such as a navigation system and sensors or components such as, for example, GPS 308 and IMU 310. The ego estimation module 312 uses this position and movement information as well as CAN data (from the truck measurement module 318) to generate ego state data for provision to the truck estimation module 306. For example, the ego estimation module 312 computes acceleration measurements for provision to the truck estimation module 306.

The truck estimation module 306 uses the information provided from the ego parameter estimation module 312, the truck measurement module 318 and the truck parameter estimation module 322 to generate mass estimates as described further herein. For example, a static mass estimation module 324 may be operated to generate an estimate of the static mass of the vehicle. For example, referring to FIGS. 1A and 1D, the static mass may be estimated as follows. First, some assumptions may be made to ignore fuel and occupant load as well as load transfer to the steer axle 127 of the semi-truck 102. All trailers 120 may be assumed to have similar properties and kingpin 112 adjustments may be ignored (and the kingpin 112 may be assumed to be centered over the drive axles 128). An approximate ratio of load supported by the trailer axle 121 to load supported by the drive axle 128 may be calculated as $R_{at}=a_2/(l_{w2}-a_2)$.

Pursuant to some embodiments, calibration parameters are established that may be used as inputs to the static mass estimation module 324. These calibration parameters may include a drive axle suspension pressure (in bobtail) referred to as $P_{ad,bt}$, and a drive axle suspension pressure (with a calibration load) referred to as $P_{ad,cal}$. As used herein, the term "calibration load" refers to a known load applied to the 5th wheel of the tractor, typically using a trailer of known mass properties. Based on these calibration parameters (which may be measured using the system components shown in FIG. 1D), kingpin gain ($C_1$) and offset ($C_0$) values may be computed as follows (with the assumption that there is zero kingpin load in bobtail). The kingpin gain $C_1= F_{kp,cal}/(P_{ad,cal}-P_{ad,bt})$ and the offset value $C_0=-C_1*P_{ad,bt}$.

The kingpin load ($F_{kp}$) to suspension pressure ($P_{ad}$) relationship can then be determined by $F_{kp}=(F_{kp,cal}(P_{ad}-P_{ad,bt})/ (P_{ad,cal}-P_{ad,bt})$. The static mass estimation module 324 may also receive additional parameters based on the model of the trailer 120 including a value of the kingpin load for an empty trailer ($F_{kp,e}$) and the value of the trailer axle weight for an empty trailer ($W_{at,e}$). The static mass estimation module 324 may then generate an estimated mass ($m_2$) of the trailer as follows: $m_2=(1+R_{at})*(F_{kp,cal}/(P_{ad,cal}-P_{ad,bt}))*(P_{ad}-P_{ad,bt})+ W_{at,e}-R_{at}*F_{kp,e}$.

Pursuant to some embodiments, a calibration process may be performed for each semi-truck 102. The calibration process may result in the generation of a gain factor ($C_1$) for a specific semi-truck 102 (which may then be stored as constant parameters for use in the mass estimation processing of the present invention). Applicants have found that a gain factor ($C_1$) for drive suspension pressure versus kingpin load is relatively consistent for different semi-trucks 102 of the same model. However, the offset is somewhat variable between trucks of the same model. Some embodiments perform a calibration process which uses the same gain factor ($C_1$) and mass for each model of semi-truck 102 to essentially set a "zero" for each truck.

One possible approach to perform a calibration process for a specific semi-truck 102 and trailer 120 model is to turn on the semi-truck 102, initiate data collection of data from the pressure transducer (item 140 of FIG. 1D), accelerate to a consistent speed such as 25 mph and drive at a constant speed over a smooth road. The control unit 200 is then operated to compute an average suspension pressure over the constant speed ($P_{ad,bt}$). Then, a trailer 120 of a known kingpin load ($F_{kp,cal}$) is coupled to the semi-truck 102 and data collection is again initiated to collect data from the pressure transducer. The vehicle is accelerated to a constant speed (e.g., 25 mph over a smooth road) and the average suspension pressure over constant speed with the trailer is computed ($P_{ad,cal}$). The gain factor for the vehicle can then be computed as $C_1 = (F_{kp,cal})/(P_{ad,cal} - P_{ad,bt})$.

One possible approach to perform a calibration process for a specific semi-truck 102 is to turn on the semi-truck 102, initiate data collection from the pressure transducer, accelerate to a consistent speed (e.g., 25 mph) over a smooth road, and compute an average suspension pressure over the constant speed ($P_{ad,bt}$).

Once a semi-truck 102 and trailer 120 have been calibrated, the trailer mass ($m_2$) may be computed as discussed above and by taking into account the computed gain factor ($C_1$) as follows: $m_2 = (1+R_{at})*(C_1)*(P_{ad}-P_{ad,bt}) + W_{at,e} - R_{at}*F_{kp,e}$.

The dynamic mass estimation module 326 may perform calculations when the vehicle is in motion. Generally, the vehicle mass only changes when a load is added to or removed from it. Such a change usually only occurs when the vehicle is stopped. The mass of the vehicle can be studied from three contexts: (1) when the vehicle is stationary; (2) when the vehicle is moving and the transmission is engaged, and (3) when the vehicle is moving and the transmission is not engaged. The total mass of the vehicle (m) including the mass of the vehicle can be summarized in each of the three context as follows: (1) $m = m_v$ (stationary vehicle), $$m = m_v + \frac{J_w}{R_w^2} + \frac{r_p^2 n_p^2 J_p}{R_w^2} \quad (2)$$

(when the transmission is connected) and $$m_{te} = m_v + \frac{J_w}{R_w^2} \quad (3)$$

(when the transmission is not connected).

In the above, $m_v$ is the static mass of the truck with a payload, $J_w$ is the moment of inertia of the wheels, $J_p$ is the moment of inertia of the engine at the wheels, $R_w$ is the wheel radius, $r_p$ is the lumped torque transfer efficiency, and m is the mass to be estimated. $J_p$, $r_p$ and $n_p$ vary depending on the transmission gear ratio.

We estimate the truck mass while it is moving employing vehicle dynamic equations that capture a dominant longitudinal motion of the vehicle. Accordingly, the truck longitudinal dynamics is given by $m_u = F_p - F_b - F_a - F_u - F_g$ where u is the derivative of vehicle speed, $F_{p1}$ is the propulsion force at the output of the powertrain, $F_b$ is the brake force, $F_{a1}$ is the air drag force, $F_u$ is the force due to friction and $F_g$ is the force due to road grade.

The longitudinal tire force $F_p$ is given as $$F_p = \frac{T_{eng,wheel}}{R_w} = \frac{r_{pe} n_{pe} T_{eng}}{R_w}$$

where $T_{eng,wheel}$ is engine torque at the wheel, $T_{eng}$ is engine torque. $r_{pe}$ and $n_{pe}$ are lumped torque transfer ratio and efficiency parameters of the engine. Longitudinal brake force $F_b$ acting on the wheels $F_b = k_b P_b$, $k_b$ is a frictional brake effectiveness factor that determines how much frictional brake torque can be realized over the braking pads given a certain brake pressure. $P_b$ is the effective brake line pressure in the wheel brake chambers at the wheel assemblies (includes for all wheels).

Drag forces $F_a$ and $F_\mu$ that includes the rolling resistance and air drag forces may be calculated as $$F_a = \frac{1}{2} \rho A_d C_d u^2$$

and $F_\mu = m_v g \mu \cos \theta$, where $\rho$ and $C_d$ are constant aerodynamic parameters, $A_d$ is a vehicle cross sectional area, and $\mu$ is the rolling resistance coefficient.

The force due to road grade is calculated as $F_g = m_v g \sin \theta$, where $\theta$ is the road grade. Considering the effect of inertial terms and using the longitudinal dynamics given above, for use in the online mass estimation the net acceleration $a_x$ is calculated as: $M_f \dot{u} = a_x - \mu g \cos \theta - \mu g \cos \theta - g \sin \theta + wv + a_d$, and $a_x = M_f \dot{u} + \mu g \cos \theta + g \sin \theta + wv + a_d$ where $a_d$ is the acceleration disturbance road grade and road friction variations and $M_f$ is the mass factor which captures the effect of inertial terms. Similarly, $\omega v$ can be considered as the disturbance from lateral and yaw dynamics.

Similarly by rearranging the longitudinal dynamics, for use in the online mass estimation the net force $F_{net}$ is calculated from $F_{net} = F_p - F_b - F_a$. Then, for a qualified longitudinal motion, we can calculate the total raw mass of the vehicle as $m_{raw} = F_{net}/a_x$.

Pursuant to some embodiments, the ego parameter estimation module 322 applies one or more gating conditions to determine qualified data for the mass estimation process. For example, pursuant to some embodiments, the combined tractor and trailer mass estimator is based on the longitudinal motion mode of the truck. As a result, the estimation process is only be activated when the vehicle's motion is significantly dominated by a longitudinal motion mode. Embodiments use gating conditions to determine whether the estimation process should proceed. In some embodiments, the following gating conditions are used: (1) the vehicle longitudinal velocity should be greater than an amount (e.g., such as 4 m/s), (2) an absence of brake force (e.g., such as 0N), (3) there should be some amount of net acceleration ($a_x$) but not much (e.g., ax should be between 0.2 m/s$^2$ and 1m/s$^2$), (4) the magnitude of the yaw rate should be low (e.g., less than 0.17 rad/sec), (5) the transmission gear should be in a high gear (e.g. greater than fifth gear), and (6) the magnitude of the slope of the propulsion force should be low (e.g. less than 1000). Other parameters may be used however applicants have found these gating conditions to provide desirable results.

The ego parameter estimation module 322 also includes an estimation fusion module 328 which applies an estimation fusion to the static mass estimation from module 324 and the dynamic mass estimation from module 326. The fusion is applied to get an estimate of mass with better accuracy and precision. The estimation fusion, pursuant to some embodiments, uses the following estimation model. $x_{k+1}=x_k, y_k=H_k x_k+v_k$ (where $v_k$ is the Gaussian measurement noise) and $x_k=m, H_k=1$, $y_k=m_{raw}$ when a qualified estimation data is available from force and acceleration measurements. Otherwise, $y_k=m_2+m_1$ when data is available from the airbag suspension pressure sensor. Here, $m_2$ comes from the static mass estimation, and $m_1$ is the mass of the tractor. We assume that the mass of the tractor is known.

A recursive estimation algorithm is developed in which: $\hat{x}_{k,k-1}$ is the predicted state estimate, $\hat{x}_{k,k}$ is the posteriori state estimate, $P_{k,k-1}$ is the predicted estimate covariance, $P_{k,k}$ is the posterior estimate covariance, $x_k$ is the state (mass), $y_k$ is the output (measurement), $v_k$ is the measurement noise at time (k) respectively, and $x_k+1$ is the mass at time k+1. The recursive estimation includes $\hat{x}_{k,k-1}=\hat{x}_{k-1,k-1}$, $P_{k,k}=P_{k-1,k-1}+Q$ where Q is the process covariance and $P_k$ is the estimation error covariance. The recursive estimation further includes $\hat{x}_{k+1,k}=\hat{x}_{k,k}$, $P_{k+1,k}=P_{k,k}+Q$, $K_{kk}=P_{k,k-1}H_k^T(H_k P_{k,k-1} H_k^T+R)^{-1}$, $\hat{x}_{k,k}=\hat{x}_{k,k-1}+K_k(y_k-H_k\hat{x}_{k,k-1})$, and $P_k=(I-K_k H_k)P_{k,k-1}(I-K_k H_k)^T+K_k R K_k^T$, where R is the measurement covariance and $K_k$ is the estimator gain. Since the parameters to be estimated are constant in nature, we initialize $P_{0,0}=R$.

The result of the estimation fusion computed by module 328 ($y_k$) is provided to vehicle parameter estimation module 330 which generates one or more estimates of vehicle parameters (including an estimate of the center of gravity of the trailer 120). The total mass of the vehicle (m which was determined by the vehicle combined mass estimation) and the semi-truck mass ($m_1$) are provided to the vehicle parameter estimation module 330. Based on this, the mass of the trailer 120 can be computed as $m_2=m-m_1$. From the suspension airbag pressure signal, the drive axle load is calculated as $m_d=C_1 P_{ad}+C_0$ where $C_1$ is the pressure to mass conversion gain and $C_0$ is the pressure to mass conversion offset.

Now, ignoring the longitudinal and lateral load transfers, from vertical forces at each axles and using the moment equations, we have the steer axle load $$m_s = \frac{m_1 b_1}{l_{w1}} + \frac{m_2 b_2 d_1}{l_{w1} l_{w2}},$$

and the drive axle load $$m_s = \frac{m_1 b_1}{l_{w1}} + \frac{m_2 b_2 d_1}{l_{w1} l_{w2}},$$

and the trailer axle load $$m_t = \frac{m_2 a_2}{l_{w2}}.$$

Then, we can calculate $$\frac{m_2 b_2}{l_{w2}} = \left(m_d - \frac{m_1 a_1}{l_{bw}}\right)\frac{l_1}{l_1 - d_1}.$$

Then, since we have the knowledge of $a_1, b_1, d_1, l_{w1}$, we can calculate the axle load distributions as follows. The steer axle load is $$m_s = \frac{m_1 b_1}{l_{w1}} + \left(m_d - \frac{m_1 a_1}{l_{w1}}\right)\frac{d_1}{l_{w1} - d_1}.$$

The drive axle load is: $m_d=C_{1pad}+C_0$. The trailer axle load is: $m_t=m-m_d-m_s$. Using this information, we can calculate the trailer 120 center of gravity 126 as:

$$a_2 = \frac{m_t l_{w2}}{m_2}$$

and $b_2=l_{w2}-a_2$, where the trailer wheelbase ($l_{w2}$) is assumed to be known (as shown in FIG. 1 above).

The ego parameter estimation module 330 and the vehicle parameter estimation module 330 may also provide estimated truck mass data, trailer mass data (and combined vehicle mass data) and trailer parameters to vehicle control systems such as those shown in FIG. 2. For example, the estimated mass and vehicle parameter data may be used by the control system 200 to adjust the throttle 284, steering 286, brakes 288 as needed to safely operate the vehicle based on the estimated mass and parameters. The center of gravity estimated by the vehicle parameter estimation module 322 may be provided to the control system 200 for use in operating the vehicle.

Reference is now made to FIG. 4 where an embodiment of a mass estimation process 400 is depicted that may be performed by the mass estimation system 300 of FIG. 3 (and the control system of FIG. 2). More particularly, the mass estimation process 400 may be performed by the ego parameter estimation module 322 of FIG. 3. In some embodiments, the combined semi-truck 102 and trailer 120 mass estimator and vehicle parameter estimations are implemented using a robot operating system ("ROS") node. The mass estimation process 400 is based on net force, air drag force, longitudinal acceleration, road grade and suspension pressure data. The net force, longitudinal acceleration and road grade values are estimated from CAN data, GPS signal data, IMU signal data and map information (e.g. by the modules of system 300).

Process 400 may be triggered, for example, on the detection of the presence of a trailer 120 (e.g., using the trailer detection process described above). If a trailer 120 is present, process 400 may begin at 402, where the estimators of FIG. 3 are reset to prepare them to perform estimations. For example, processing at 402 may include resetting the ego estimation 312, truck estimation 306 and ego parameter estimation 322 modules. Processing at 402 may also include loading truck parameters, estimator gate parameters as well as providing an initial guess for mass and estimation error covariance.

Processing continues at 404 where parameters and measurements for use in performing estimation processing are received. For example, recent measurements and estimation values may be received from other modules of the system 300. These measurements and values may be provided on a subscription basis (e.g., the ego parameter estimation module 322 may "subscribe" to receive updated data as it is generated from other modules such as the truck estimation module 306, the truck measurement module 318 and the trailer status module 320).

Pursuant to some embodiments, processing may continue in parallel to 420 where the static mass estimation module 324 is operated to compute an estimate of the static mass of the vehicle from the airbag suspension pressure signal (as discussed above in conjunction with FIG. 1D). Processing continues in parallel with the static mass estimation at 406 where a determination is made whether a gating condition is met. For example, the gating condition may be as described above where a determination whether the vehicle has a significant longitudinal motion (e.g., is travelling within a certain velocity range, has no brake pressure applied, etc.). If true, then processing continues at 410 where the raw mass is computed from the net force and acceleration measurements as discussed above. If not, then processing continues at 408 where the raw mass is set to equal the previous mass estimate (e.g., the mass estimate determined from a previous iteration of the process 400).

Processing continues at 412 where a determination is made whether an estimation covariance error counter should be reset or not. When the covariance error counter nears zero, the effect of newly arriving data is minimal. The covariance error counter reset is used to ensure that the estimation process is able to react to new data. If the counter does not need to be reset, the estimation covariance error counter is incremented by one at 418 and the raw mass is passed to the Kalman filter at 422 and the dynamic mass estimation processing is performed (as described above). If processing at 412 indicates that the counter needs to be reset, processing continues at 414 where the counter is reset and at 416 where other estimators are reset. Processing continues at 422 where the dynamic mass estimation processing is performed to compute the estimated mass. Processing continues at 424 where the prediction from the static mass estimation at 420 and the dynamic mass estimation at 422 are fused (e.g., using the estimation fusion module 328 of FIG. 3).

Processing continues at 428 where a qualified estimation counter is incremented. Processing continues at 430 where a determination is made whether the qualified estimation counter is above a threshold. If so (indicating that the fusion processing likely resulted in an accurate estimation), processing continues at 432 where the estimated mass is set equal to the mass estimation fusion estimate (and the estimated mass can be provided to the control system 200 for use in vehicle control). If the qualified estimation counter is below a threshold (indicating that the mass estimation fusion estimate may be inaccurate), processing continues at 434 where the estimated mass is set to be equal to the value from the static mass estimation (from 420) (and the estimated mass can be provided to the control system 200 for use in vehicle control).

If processing at 406 indicates that the gate is not activated (that is, that significant longitudinal motion is not present), the qualified estimation counter is below a threshold and the estimated mass is equal to the static mass from 420. The estimated mass returned from the process 400 may be provided to the control system 200 for further operation including, for example, for performing vehicle parameter estimation processing by module 330 of FIG. 3. For example, the vehicle parameter estimation module 330 may determine the per-axle load distributions, trailer mass, and trailer horizontal center of gravity calculations as described above. All of these parameters may be provided to other components of the control system 200 for controlling vehicle operation. The estimated mass computed by the process 400 (as well as the estimated vehicle parameters, such as the trailer center of gravity) may be provided to the control system 200 for use in a number of control applications. For example, the estimated mass may be used in longitudinal control of the vehicle to determine the amount of throttle control to reach a desired speed, the amount of brake force required to slow or stop the vehicle in a given distance, or in the lateral control of the vehicle to determine the amount of steering control during high curvature maneuvers. The process 400 of FIG. 4 repeats as shown by item (1) of FIG. 4.

5A-5C are diagrams illustrating exterior views of a semi-truck 500 that may be used in accordance with example embodiments. Referring to FIGS. 5A-5C, the semi-truck 500 is shown for illustrative purposes only—those skilled in the art, upon reading the present disclosure, will appreciate that embodiments may be used in conjunction with a number of different types of vehicles. The example semi-truck 500 shown in FIGS. 5A-5C is one configured in a common North American style which has an engine 506 forward of a cab 502, a steering axle 514 and two drive axles 516. A trailer (not shown) is attached to the semi-truck 500 via a fifth-wheel trailer coupling that is provided on a frame 518 positioned over the drive axles 516. A sleeper compartment 512 is positioned behind the cab 502. A number of sensors are positioned on different locations of the semi-truck 500. For example, sensors may be mounted on a roof of the cab 502 on a sensor rack 520. Sensors may also be mounted on side mirrors 510 as well as other locations. As will be discussed, sensors may be mounted on the bumper 504 as well as on the side of the cab 502 or other locations. Embodiments may be used with other configurations of trucks or other vehicles (e.g., such as semi-trucks having a cab over or cab forward configuration or the like). For example, embodiments may be used in conjunction with other types of vehicles that tow a trailer to allow improved information about trailer orientation. In general, and without limiting embodiments of the present invention, features of the present invention may be used with desirable results in vehicles that carry cargo over long distances, such as long-haul semi-truck routes.

FIG. 5B is a front view of the semi-truck 500 and illustrates a number of sensors and sensor locations. The sensor rack 520 may secure and position several sensors including a long range lidar 522, long range cameras 524, GPS antennas 534, and mid-range front facing cameras 526. The side mirrors 510 may provide mounting locations for rear-facing cameras 528 and mid-range lidar 530. A front radar 532 may be mounted on the bumper 504. It will be appreciated to one of skill in the art that sensors may be mounted or installed on other locations and the types of sensors at various locations are not limited to the exemplary embodiments therein as the locations, sensor types and mounts depicted in FIGS. 5A-5C are for illustrative purposes only. Referring now to FIG. 5C, a partial view of the semi-truck 500 is shown which shows an interior of the cab 502 and the sleeper compartment 512. In some embodiments, portions of the control system 200 of FIG. 2 are deployed in a systems rack 540 in the sleeper compartment 512, allowing easy access to components of the control system 200 for maintenance and operation.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A system for estimating a current mass of a vehicle, comprising:
    a communication interface to receive data from a plurality of vehicle systems;
    a processor configured to
        determine whether a trailer is attached to the vehicle;
        compute an estimate of the static mass of the vehicle and the trailer;
        determine whether a gating condition is met based on at least one of an acceleration measurement and a current net force measurement;
        generating a computed dynamic mass of the vehicle and the trailer if the gating condition is met by performing a fusion of an estimate of dynamic mass and the static mass; and
        determine to use one of (i) the computed dynamic mass, or (ii) the static mass as the current estimated mass of the vehicle and the trailer.

2. The system of claim 1, wherein the processor is further configured to:
    compute at least a first vehicle parameter.

3. The system of claim 2, where the at least first vehicle parameter is at least one of (i) an estimated horizontal center of gravity of the trailer, (ii) an estimated mass of the trailer, and (iii) an estimated per-axle load distribution of the trailer.

4. The system of claim 2, wherein the processor is further configured to:
    transmit the at least first vehicle parameter and the current estimated mass of the vehicle and the trailer to a control system of the vehicle to adjust operation of the vehicle.

5. The system of claim 1, wherein the gating condition further requires at least one of (i) a minimum longitudinal velocity of the vehicle, and (ii) that a braking force is approximately equal to 0 Newtons.

6. The system of claim 1, wherein the processor is further configured to:
    compute, based at least in part on the current estimated mass of the vehicle and the trailer, at least a first trailer parameter.

7. The system of claim 1, wherein the processing to determine that a trailer is attached to the vehicle further comprises processing to:
    receive a suspension pressure value;
    filter the suspension pressure value; and
    compare the filtered suspension pressure value to a predetermined trailer detection limit.

8. The system of claim 7, wherein the processing to establish the predetermined trailer detection limit further comprises processing to:
    receive a first suspension pressure value when a trailer is not attached to the vehicle;
    receive a second suspension pressure value when a trailer is attached to the vehicle; and
    establish the predetermined trailer detection limit as the average of the first and second suspension pressure values.

9. The system of claim 7, wherein comparing the filtered suspension pressure value to a predetermined trailer detection limit further comprises processing to:
    establish a hysteresis value by subtracting the predetermined trailer detection limit from the first suspension pressure value and dividing by two.

10. The system of claim 1, wherein the determining to use the computed dynamic mass as the current estimated mass of the vehicle and the trailer further comprises operating the processor to:
    determine that a qualified estimation counter is above a threshold.

11. The system of claim 1, wherein the determining to use the static mass as the current estimated mass of the vehicle and the trailer further comprises operating the processor to:
    determine that a qualified estimation counter is below a threshold.

12. The system of claim 1, wherein the processing to generate a computed dynamic mass of the vehicle and the trailer further comprises processing to perform the fusion of the estimate of dynamic mass and the static mass using a Kalman filter.

13. The system of claim 1, wherein the processing to determine to use the static mass as the current estimated mass of the vehicle and the trailer further comprises processing to:
    determine that a trailer is not attached to the vehicle.

14. A method for estimating a current mass of a semi-truck and a trailer, comprising:
    determining whether a trailer is attached to the vehicle;
    computing an estimate of the static mass of the vehicle and the trailer;

determining whether a gating condition is met based on at least one of an acceleration measurement and a current net force measurement;

generating a computed dynamic mass of the vehicle and the trailer if the gating condition is met by performing a fusion of an estimate of dynamic mass and the static mass; and determining to use one of (i) the computed dynamic mass, and (ii) the static mass as the current estimated mass of the vehicle and the trailer.

15. The method of claim 14, further comprising:

computing at least a first trailer parameter;

transmitting the at least first trailer parameter and the current estimated mass of the vehicle and the trailer to a vehicle control system to control operation of the vehicle.

16. The method of claim 15, wherein the at least first trailer parameter is at least one of (i) a trailer horizontal center of gravity, (ii) a trailer mass, and (iii) a per-axle load distribution of the trailer.

17. The method of claim 14, wherein determining that a trailer is attached to the vehicle includes:

receiving a suspension pressure value;

filtering the suspension pressure value; and comparing the filtered suspension pressure value to a predetermined trailer detection limit.

18. The method of claim 17, wherein establishing the predetermined trailer detection limit includes:

receiving a first suspension pressure value when a trailer is not attached to the vehicle;

receiving a second suspension pressure value when a trailer is attached to the vehicle; and establishing the predetermined trailer detection limit as the average of the first and second suspension pressure values.

19. The method of claim 14, wherein the determining to use the computed estimated dynamic mass as the current mass of the vehicle and the trailer further comprises:

determining that a qualified estimation counter is above a threshold.

20. The method of claim 14, wherein generating an estimated dynamic mass of the vehicle and the trailer further comprises performing the fusion of the estimate of dynamic mass and the static mass using a Kalman filter.

* * * * *